United States Patent
Kanevsky et al.

(10) Patent No.: US 9,826,083 B2
(45) Date of Patent: Nov. 21, 2017

(54) AUTOMATIC DELEGATION CONTROL FOR DEVICE SHARING

(71) Applicant: Google Inc., Mountain View, CA (US)

(72) Inventors: Dimitri Kanevsky, Ossining, NY (US); Marcel M. M. Yung, New York, NY (US)

(73) Assignee: Google Inc., Mountain View, CA (US)

( * ) Notice: Subject to any disclaimer, the term of this patent is extended or adjusted under 35 U.S.C. 154(b) by 3 days.

(21) Appl. No.: 14/869,223

(22) Filed: Sep. 29, 2015

(65) Prior Publication Data

US 2017/0094049 A1 Mar. 30, 2017

(51) Int. Cl.
| | |
|---|---|
| *H04M 1/725* | (2006.01) |
| *H04W 12/02* | (2009.01) |
| *H04W 12/08* | (2009.01) |
| *G06F 21/32* | (2013.01) |

(52) U.S. Cl.
CPC ........ *H04M 1/72577* (2013.01); *G06F 21/32* (2013.01); *H04W 12/02* (2013.01); *H04W 12/08* (2013.01); *G06F 2221/2139* (2013.01)

(58) Field of Classification Search
CPC ... H04L 51/046; H04L 63/0861; G06F 21/32; G06F 2221/2117; G06Q 20/40145; G06Q 20/32; H04M 1/271; H04M 2250/74; H04M 3/387; H04M 3/42238; H04W 76/02; H04W 8/18; H04W 48/16
See application file for complete search history.

(56) References Cited

U.S. PATENT DOCUMENTS

| | | | |
|---|---|---|---|
| 8,805,029 B1 | 8/2014 | Yeung | |
| 8,914,645 B2 | 12/2014 | Duncan | |
| 2009/0327911 A1* | 12/2009 | Ningune | G06F 21/604 715/744 |
| 2010/0115610 A1 | 5/2010 | Tredoux et al. | |
| 2012/0254989 A1* | 10/2012 | Levien | G06F 3/011 726/19 |
| 2012/0254992 A1 | 10/2012 | Levien et al. | |
| 2013/0097416 A1 | 4/2013 | Barra et al. | |
| 2013/0267204 A1 | 10/2013 | Schultz et al. | |
| 2013/0347102 A1 | 12/2013 | Shi | |

(Continued)

FOREIGN PATENT DOCUMENTS

EP    1318459 A1    6/2003

OTHER PUBLICATIONS

International Search Report and Written Opinion of International Application No. PCT/US2016/053443, dated Nov. 24, 2016, 11 pp.

*Primary Examiner* — Nizar Sivji
(74) *Attorney, Agent, or Firm* — Shumaker & Sieffert, P.A.

(57) ABSTRACT

A computing device receives voice input that includes first voice input from a first user and second voice input from a second user. The computing device may determine, based at least in part on the received voice input, a change in possession of the computing device. The computing device may determine, based at least in part on the first voice input and the second voice input, delegation of the computing device from the first user to the second user. The computing device may, in response to determining the change in possession of the computing device and the delegation of the computing device, change at least a level of access to functionality of the computing device from a first level of access to a second level of access.

20 Claims, 4 Drawing Sheets

(56) References Cited

U.S. PATENT DOCUMENTS

2014/0273848 A1 9/2014 Rahman et al.
2014/0283014 A1 9/2014 Tse et al.
2014/0289819 A1 9/2014 Lindemann
2014/0289820 A1 9/2014 Lindemann et al.
2014/0316984 A1 10/2014 Schwartz

* cited by examiner

AUTOMATIC DELEGATION CONTROL FOR DEVICE SHARING

BACKGROUND

Mobile computing devices, such as mobile phones, tablet computers, and wearable computing devices, have become an important part of many peoples' lives. Users may utilize such devices to access their personal and business e-mails, personal photos, social network accounts, and other sensitive information that they may not wish to share with other people. In order to secure the mobile computing device, a user may enable a security challenge (e.g., passcode, pin, pattern, etc.) that must be entered before gaining access to the information stored at the mobile computing device. However, if a user hands an unlocked mobile computing device to another person, the other person may have access to all of the sensitive information on the mobile computing device even if the user does not want the person to have such access.

SUMMARY

In one aspect, the disclosure is directed to a method. The method includes receiving, by a computing device, voice input that includes first voice input from a first user and second voice input from a second user. The method further includes determining, by the computing device and based at least in part on the received voice input, a change in possession of the computing device. The method may further include determining, by the computing device and based at least in part on the first voice input and the second voice input, delegation of the computing device from the first user to the second user. The method further includes in response to determining the change in possession of the computing device and the delegation of the computing device, changing, by the computing device, at least a level of access to functionality of the computing device from a first level of access to a second level of access.

In another aspect, the disclosure is directed to a computing device. The computing device includes a memory configured to store instructions. The computing device further includes an audio input device configured to receive voice input that includes first voice input from a first user and second voice input from a second user. The computing device further includes one or more processors configured to execute the instructions to: determine, based at least in part on the received voice input, a change in possession of the computing device; determine, based at least in part on the first voice input and the second voice input, delegation of the computing device from the first user to the second user; and in response to determining the change in possession of the computing device and the delegation of the computing device, change at least a level of access to functionality of the computing device from a first level of access to a second level of access.

In another aspect, the disclosure is directed to a non-transitory computer readable medium encoded with instructions that, when executed, cause one or more processors of a computing device to: receive voice input that includes first voice input from a first user and second voice input from a second user; determine, based at least in part on the received voice input, a change in possession of the computing device; determine, based at least in part on the first voice input and the second voice input, delegation of the computing device from the first user to the second user; and in response to determining the change in possession of the computing device and the delegation of the computing device, change at least a level of access to functionality of the computing device from a first level of access to a second level of access.

The details of one or more aspects of the disclosure are set forth in the accompanying drawings and the description below. Other features, objects, and advantages of the disclosure will be apparent from the description and drawings, and from the claims.

DETAILED DESCRIPTION

In general, aspects of the disclosure are directed towards techniques for automatic delegation control for changes in possession of a computing device. A computing device may detect that someone other than a primary user of the computing device possesses the computing device and may, in response, change the level of access afforded to the functionality of the computing device. For example, the user of the computing device may lend the computing device to another user to perform a task using the computing device. In another example, the user may involuntarily lose possession of the computing device. By changing the level of access to the functionality of the computing device in response to determining a change in possession of the computing device, the computing device may be able to protect the sensitive information of the user that is stored on or accessible using the computing device when the user does not possess the computing device.

Functionality of the computing device may include applications that run on the computing device as well as features of those applications. As such, changing the level of access afforded to the functionality of the computing device may include preventing use of one or more applications on the computing device or preventing the use of or access to the functionality of the applications running on the computing device. In one example, changing the level of access afforded to the functionality of the computing device may include preventing use or access to a messaging application, or may include limiting the a user to sending only text messages to a limited list of recipients using the messaging application.

Figure 1:
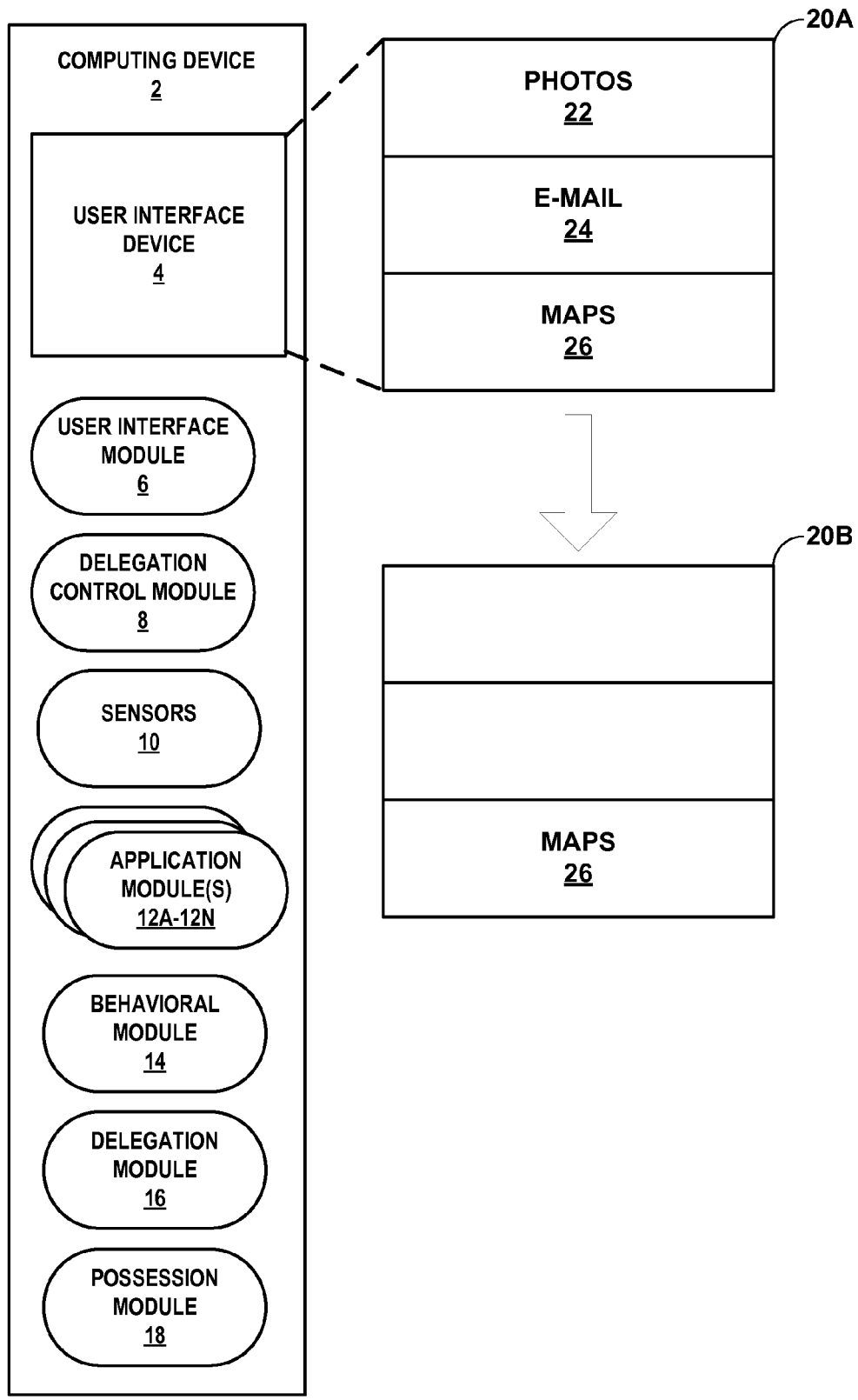
FIG. 1 is a conceptual diagram illustrating an exemplary computing device configured to perform exemplary techniques for performing automatic delegation control for sharing a computing device, in accordance with one or more aspects of the present disclosure.

FIG. 1 is a conceptual diagram illustrating an exemplary computing device configured to perform exemplary techniques for automatic delegation control for sharing a computing device, in accordance with one or more aspects of the present disclosure. As shown in FIG. 1, computing device 2 may include, but is not limited to, portable or mobile devices such as mobile phones (including smart phones), laptop computers, tablet computers, wearable computing devices such as smart watches or computerized eyewear, smart television platforms, cameras, personal digital assistants (PDAs), etc. In some examples, computing device 2 may include stationary computing devices such as desktop computers, servers, mainframes, smart sensors (e.g., building thermostats), etc. In other examples, computing device 2 may be embedded into physical objects as a part of the Internet of Things (IoT). Computing device 2, in some examples, may include user interface (UI) device 4, UI device module 6, delegation control module 8, sensors 10, application modules 12A-12N ("applications 12"), behavioral module 14, and delegation module 16. Other examples of computing device 2 that implement techniques of this disclosure may include additional components not shown in FIG. 1.

UI device 4 of computing device 2 may function as an input device for computing device 2 and as an output device. For instance, UI device 4 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UI device 4 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 2.

UI device 4 of computing device 2 may include a presence-sensitive screen that may receive tactile user input from a user of computing device 2. UI device 4 may receive the tactile user input by detecting one or more taps and/or gestures from a user of computing device 2 (e.g., the user touching or pointing to one or more locations of UI device 4 with a finger or a stylus pen). The presence-sensitive screen of UI device 4 may present output to a user. UI device 4 may present the output as a user interface (e.g., a graphical user interface (GUI)), which may be related to functionality provided by computing device 2. For example, UI device 4 may present various functions and applications executing on computing device 2 such as an electronic message application, a map application, etc.

Computing device 2 may include user interface ("UI") module 6. UI module 6 may perform operations described herein using software, hardware, or a mixture of both hardware and software residing in and executing on computing device 2. Computing device 2 may execute UI module 6 with one or more processors. Computing device 2 may execute UI module 6 as a virtual machine executing on underlying hardware. UI device module 6 may interpret inputs detected at UID 4 (e.g., as a user provides one or more gestures at a location of UID 4 at which a GUI or another example user interface is displayed). UI device module 6 may relay information about the inputs detected at UID 4 to one or more associated platforms, operating systems, applications, and/or services executing at computing device 2 to cause computing device 2 to perform a function. UI device module 6 may also receive information and instructions from one or more associated platforms, operating systems, applications, and/or services executing at computing device 2 (e.g., applications 12) for generating a user interface. In addition, UI device module 6 may act as an intermediary between the one or more associated platforms, operating systems, applications, and/or services executing at computing device 2 and various output devices of computing device 2 (e.g., speakers, LED indicators, vibrators, etc.) to produce output (e.g., graphical, audible, tactile, etc.) with computing device 2.

UI device module 6 may be implemented in various ways. For example, UI device module 6 may be implemented as a downloadable or pre-installed application or "app." In another example, UI device module 6 may be implemented as part of a hardware unit of computing device 2. In another example, UI device module 6 may be implemented as part of an operating system of computing device 2. In some instances, portions of the functionality of UI device module 6 or any other module described in this disclosure may be implemented across any combination of an application, hardware unit, and operating system.

In the example of FIG. 1, UI device module 6 may cause UI device 4 to present GUI 20A. GUI 20A is illustrated as a GUI that presents UI elements 22, 24, and 26, that are associated with applications 12 of computing device 2, such as a photos application, an e-mail application, and a maps application, respectively, that may be accessed by a user of computing device 2 by providing input (e.g., one or more gestures) at a location of UID 4 to select one of the presented applications. For example, the user of computing device 2 may select UI element 22 to access photos application to view photos that are stored on computing device 2 or are otherwise accessible via the photos application. Similarly, the user of computing device 2 may select UI element 24 to access the e-mail application to access an e-mail account that is accessible via the e-mail application to view e-mail messages associated with the e-mail account. The user of computing device 2 may also select UI element 26 to access the maps application to access navigation functionality (e.g., turn-by-turn directions) of the maps application.

Sensors 10 may include hardware and/or software that receive motion, orientation, position, environmental conditions, and other measurands as input, and sensors 10 may output sensor data that quantify the measured motion, position, pressure, audio, temperature, and the like. Examples of sensors 10 may include an accelerometer, a gyroscope, a gravity sensor, a rotational vector sensor, a light sensor, a temperature sensor, a pressure sensor, a proximity sensor, a voice sensor (e.g., a microphone), a physical switch, orientation sensors, a magnetometer, and the like. Sensors 10 may continuously collect data regarding motion, orientation, position, environmental conditions, and the like while computing device 2 is powered on. In some examples, sensors 10 may collect such data even while computing device is in a sleep state via the use of co-processors (e.g., motion co-processors).

Computing device 2 may include delegation control module 8, behavior module 14, delegation module 16, and possession module 18. Modules 8, 14, 16, and 18 may perform operations described herein using software, hardware, or a mixture of both hardware and software residing in and executing on computing device 2. Computing device 2 may execute modules 8, 14, 16, and 18 with one or more processors. Computing device 2 may execute modules 8, 14, 16, and 18 as a virtual machine executing on underlying hardware.

Behavioral module 14 may receive sensor data from sensors 10 and may determine, based at least from the sensor data received from sensors 10, behavioral characteristics of the user that is in physical possession of computing device 2. Behavioral module 14 may also receive sensor data from sensors of associated wearable devices that are worn by or otherwise physically attached to the user that is in physical possession of computing device 2. For example, behavioral module 14 may receive sensor data from an accelerometer, a gyroscope, and the like of a smart watch that is worn by the user. Behavioral module 14 may also receive sensor data from beacons, a global positioning system (GPS) component and/or device that provides data to sensors 10 for localization purposes, and the like.

The user that is in physical possession of computing device 2 may be a user that is physically interacting with computing device 2, such as via UI device 4, by providing user input, such as tactile user input, that is received by UI device 4. The user that is in physical possession of computing device 2 may also be a user that is physically carrying the phone, such as in the user's pocket, in the user's bag or purse, in the user's hand, and the like, or a user to which computing device 2 is physically attached.

Behavioral characteristics of the user that is in physical possession of computing device 2 may include physical behavioral characteristics of the user, such as limb movement patterns of the user, such as gait patterns, hand movement patterns, and the like. Sensors 10, such as an accelerometer and a gyroscope, may receive as input physical movement of computing device 2 and may quantify such physical movement as sensor data for behavioral module 14 to determine the behavioral characteristics of the user that physically possesses computing device 2. Besides physical behavioral characteristics, behavioral characteristics may also include other user characteristics such as the computing device usage pattern of computing device 2 by the user, user input patterns of the user, and the like.

Behavioral characteristics, such as physical behavioral characteristics, may differ from person to person. For example, different people may have different gait patterns that differ in stride length, pace, and the like, different patterns of hand movement, and the like. As a person is in motion while taking a walk, the motion of certain body parts of the person may move in a rhythmic motion such that those body parts of the person may rhythmically and repeatedly reach certain positions. For example, a person that is walking may repeatedly swing his arms such that his forearms on average reach a vertical position every three seconds, while another person that is walking may repeatedly swing her arms such that her forearms on average reach a 80 degree angle every 4 seconds. As such, computing device 2 may differentiate between these two people based at least in part on the difference in behavioral characteristics between these two people. Further, different body parts may repeatedly reach certain positions with different frequencies. For example, A person's left leg may repeatedly reach the same position every three seconds, while the silhouette of the person's body may repeatedly reach the same position with twice the frequency (i.e., every 1.5 seconds) in comparison to the frequency of the left leg.

If more than a single user uses or physically possesses computing device 2, behavioral module 14 may determine behavioral characteristics of multiple users of computing device 2, and may differentiate between each of the multiple users based at least in part on the determined behavioral characteristics of each of the multiple users. In response to determining that the user physically possessing computing device 2 moves in such a way that their behavioral characteristics matches behavioral characteristics associated with one of the users that is associated with computing device 2, behavioral module 14 may recognize the user that physically possesses computing device 2 as that one of the users associated with computing device 2.

If computing device 2 is a mobile computing device, such as a mobile phone, tablet computer, or wearable device (e.g., smart watch), in some examples computing device 2 may primarily be in the possession of and be used by a single user, such as the owner of computing device 2. Such a user is also known as the primary user of computing device 2. Such a primary user may, for example, be logged into her e-mail account in an e-mail application on computing device 2, have her personal photos be accessible in a photos application on computing device 2, and be logged into her social networking accounts in social networking applications on computing device 2. In other examples, computing device 2 may be shared amongst multiple users, such as a tablet computer that may be shared amongst members of a family or household. In these examples, there may not be a primary user of computing device 2 because there is not one user that primarily uses and/or possesses computing device 2.

Behavioral module 14 may associate a set of behavioral characteristics with users of computing device 2 based on a period of collecting behavioral data as users uses or possesses computing device 2. For example, behavioral module 14 may collect data regarding the motion characteristics of the user, such as the gait pattern of a user as the user walks while physically possessing computing device 2, data regarding the hand movement of the user as the user physically holds computing device 2, and the like, and may establish a set of behavioral characteristics for the user based on the collected data. If more than one user uses or possesses computing device 2, behavioral module 14 may, in some examples, collect behavioral data for each user to establish a set of behavioral characteristics for each user. If computing device 2 is associated with a primary user, behavioral module 14 may collect behavioral data for the primary user and may associate a set of behavioral characteristics with the primary user of computing device 2 based at least in part on the collected behavioral data. Alternatively, if computing device 2 is shared amongst multiple users, computing device 2 may associate a set of behavioral characteristics with each of a plurality of users of computing device 2 based at least in part on the behavioral data collected for each of the plurality of users.

Behavioral module 14 may determine a change in one or more behavioral characteristics of the user of computing device 2 and may determine a change in possession of computing device 2 based at least in part on the change in one or more behavioral characteristics of the user. If behavioral module 14, based upon the behavioral data continually collected by sensors 10, detects that the behavioral characteristics of the user possessing computing device 2 diverges from the behavioral characteristics associated with the user that is possessing computing device 2 at that time, behavioral module 14 may determine that a change in possession of computing device 2 has taken place. For example, behavioral module 14 may determine that a change in possession of computing device 2 has taken place if motion characteristics, such as the gait pattern and/or the hand movement pattern of the user possessing computing device 2 deviate by a specified threshold from the gait pattern and/or hand movement pattern associated with the user physically possessing computing device 2 for a specified threshold amount of time.

For example, behavioral module 14 may determine that a change in possession of computing device 2 has taken place if the stride and/or pace of the user of computing device 2 deviates more than 25% from the stride and/or pace associated with the user of computing device 2 for more than 10 seconds.

For example, a user that physically possesses computing device 2 may walk while holding computing device 2 in her hand. Sensors 10 may measure motion data via accelerometers, gyroscopes, and the like and may generate sensor data that is indicative of the motion data. Behavioral module 14 may determine gait patterns, hand movement patterns, and the like to generate a set of behavioral characteristics for the user. The user may walk towards a table and sets computing device 2 down on the table. When computing device 2 has been set on to the table and is stationary on the table, sensors 10 may continue to measure motion data and behavioral module 14 may continue to generate a set of behavioral characteristics for the user of computing device 2. However, because computing device 2 is now lying stationary on the table, behavioral module 14 may determine that the behavioral characteristics for the user of computing device 2 now deviates by more than a specified threshold from the set of behavioral characteristics associated with the user that previously physically possessing computing device 2. Behavioral module 14 may thereby determine that there has been a change in possession of computing device 2.

In another example, the user that physically possesses computing device 2 may walk while holding computing device 2 in her hand. A robber may grab computing device 2 out of the user's hand and may sprint away from the user while holding computing device 2. Computing device 2 may determine, while the robber is running with computing device 2, that the gait pattern and/or hand motion pattern of the user that physically possesses computing device 2 now deviates by more than a specified threshold from the gait pattern and/or hand motion pattern of the user who was robbed of computing device 2. Behavioral module 14 may thereby determine that there has been a change in possession of computing device 2.

In certain examples, physically possessing computing device 2 may include physically possessing accessories or portions of computing device 2. For example, if computing device 2 is a TV set top box that is controlled with an associated remote control, the user that physically possesses the remote control may be deemed to be the user that physically possesses computing device 2. The remote control may include one or more sensors of sensors 10, such as an accelerometer, a gyroscope, and the like, which may be used to generate sensor data for behavioral module 14 to determine behavioral characteristics of the user as the user holds and/or interacts with the remote control. If computing device 2 determines that the remote control changes possession from one user to another user, computing device 2 may determine that a change in possession of computing device 2 has occurred.

In other examples, a change in possession of computing device 2 may include a change in the primary operator of computing device 2. For example, computing device 2 may be a computing system of an automotive vehicle, and may determine a change in possession of the automotive vehicle based at least in part on determining a change in the driver of the automotive vehicle. Behavioral module 14 may determine behavioral characteristics of various drivers of the automotive vehicle and may determine that the driver of the automotive vehicle is one of a plurality of drivers having associated behavioral characteristics based at least in part on the detected behavioral characteristics of the driver.

Computing device 2 may also determine a change in possession of computing device 2 based at least in part on receiving user input that indicates an intent from a first user to delegate computing device 2 to a second user. A first user as a delegator may delegate computing device 2 to a second user as a delegatee, so that the second user may, in place of the first user, provide user input to direct computing device 2 to perform a function. The first user may be the primary user of computing device 2 or any other user that is able to delegate computing device 2. By delegating computing device 2 to a second user, the primary user in effect lends computing device 2 to a non-primary user of computing device 2 so that the non-primary user may use computing device 2 as directed by the primary user. By determining an intent from a first user to delegate computing device 2 to a second user, delegation module 16 may determine a change in possession of computing device 2 and may, for example, direct delegation control module 8 to determine the level of access of functionality of computing device 2 for the delegatee.

The user input received by computing device 2 that indicates an intent from the first user to delegate computing device 2 to the second user may be voice input from the first user and vocal input the second user. Delegation module 16 may determine, based at least in part on the voice inputs from the first user and second user received by computing device 2, that the first user intends to delegate computing device 2 to the second user, and that the second user accepts the delegation of computing device 2 from the first user. Such voice inputs may not necessarily be speech that is directed at computing device 2. Rather, such voice inputs may include a conversation between the delegator and a delegatee that is received by a microphone or other suitable audio input device included in or otherwise operably coupled to computing device 2. Delegation module 16 may perform speech recognition and/or natural language processing on the voice input to recognize the spoken words carried by the voice inputs and spoken by the delegator and/or delegatee, and may determine based on the processed voice input that the voice inputs indicates an intent by the first user to delegate computing device 2 and an intent to accept the delegation by the second user.

In one example, the voice inputs may include intentional voice commands spoken by the first user to delegate computing device 2 to the second user and spoken by the second user to accept delegation of computing device 2 from the first user. Such commands may be a directive for computing device 2 to perform a specific task, and may be in a specified format. The first user and the second user may each speak one or more voice commands that delegation module 16 receives as voice input and recognizes as commands to delegate use and/or possession of computing device 2 from the first user to the second user. For example, a user named John may delegate use of computing device 2 to a user named Lena by speaking a command to delegate computing device 2 to Lena, and Lena may speak a command to accept delegation of computing device 2 from John. John may say "delegate my phone to Lena," which computing device 2 may receive as first voice input. Subsequently, Lena may respond by saying "thank you," which computing device 2 may receive as second voice input. A microphone included in or operably coupled to computing device 2 may receive the speech from both John and Lena as first and second vocal inputs and may recognize the first voice input "delegate my phone to Lena" as a valid command to delegate computing device 2 to a user named Lena, and may further recognize the second voice input "thank you" as a valid command to accept the delegation of computing device 2.

In this example, the phrase "delegate my phone to <user>" may be a specific command that is recognized by delegation module 16 as a command from a delegator to delegate computing device 2 to a delegatee specified by <user>, such as Lena. Similarly, the phrase "thank you" may also be a specific command that is recognized by delegation module 16 as a command from the delegatee to accept the delegation of computing device 2 in response to the command to delegate computing device 2.

Delegation module 16 may perform speaker recognition and verification to determine, based at least in part on the audio characteristics of the spoken command "delegate my phone to <user>" received as voice input from the first user, whether the speaker of the command is a primary user of computing device 2 or a user that is otherwise privileged to act as a delegator to delegate computing device 2 to a delegatee. For example, computing device 2 may associate a voice profile to one or more users of computing device 2, and may be able to determine whether vocal characteristics that are received as audio input match with any of the voice profiles associated with users of computing device. Delegation module 16 may, based upon the received voice input, determine whether the speaker of the command "delegate my phone to <user>" is a user that is privileged to delegate computing device 2 to a delegatee.

Similarly, delegation module 16 may also perform speaker recognition and verification to verify, based at least in part on the audio characteristics of the voice input from the second user to accept delegation of computing device 2, whether the second user that accepts delegation of computing device 2 is the intended delegatee of computing device 2. Delegation module 16 may compare the vocal characteristics of the phrase "thank you" spoken by the second user with a voice profile associated with the delegatee specified by the delegator (e.g., Lena). In this way, the phrase "thank you" is recognized by delegation module 16 as a valid spoken command to accept delegation of computing device 2 if delegation module 16 determines that the speaker of the phrase "thank you" is the delegatee specified by the delegator.

The delegator may also issue a voice command that specifies both the delegatee and the level of access to computing device 2 that is granted to the delegatee. In the example of John delegating computing device 2 to Lena, John might say "delegate my phone to Lena as a user level 2," where "user level 2" may be a specified level of access to functionality of computing device 2. In other words, a delegator may say a voice command in the form of "delegate my phone to <user> as <access level>," where <user> is the specified delegatee and <access level> is the specified level of access to functionality of computing device 2.

Delegation module 16 may also be able to determine that voice inputs received by computing device 2 from a first user and a second user indicates intentional delegation of computing device 2 by the first user to the second user even if the delegator (i.e., first user) does not say a voice command recognized by delegation module 16 to delegate use and/or possession of computing device 2 to the second user. Rather, the first user says a phrase that delegation module 16 determines to be an unintentional voice command that indicates an intent to delegate computing device 2 to the second user. A phrase may be an unintentional voice command if the phrase is not intended to be a command directed at computing device 2 to perform a specific task. For example, the phrase may not follow a specified format for recognized commands of computing device 2. However, computing device 2 may nonetheless interpret the phrase as a command directed at computing device 2 to perform a specified task.

In one example, John may say "Lena, please check the route in Maps," which computing device 2 may receive as voice input. Lena may physically take computing device 2 and may say "open Maps," which computing device 2 may receive as voice input. In this example, while delegation module 16 may recognize the phrase "open Maps" spoken by Lena as a command that directs computing device 2 to open the Maps application, delegation module 16 may not recognize the phrase "please check the route in Maps" spoken by John as a command to delegate use and/or possession of computing device 2 from John to Lena. Nonetheless, delegation module 16 may determine that the phrase "Lena, please check the route in Maps" spoken by John is an unintentional voice command to delegate computing device 2 to Lena based at least in part on determining that one or more words in the phrase spoken by the delegator matches one or more words in the phrase spoken by the delegatee.

Delegation module 16 may analyze the voice inputs received from the first user and the second user to determine whether the first user intends to delegate computing device 2. In the example above, the phrase spoken by John starts with "Lena." As such, delegation module 16 determines that the phrase spoken by John was directed to Lena. If delegation module 16 determines, such as via voice authentication, that Lena is the person that accepts delegation of computing device 2 by speaking the command "open Maps," Further, both the phrase spoken by John and the phrase spoken by Lena include the word "Maps." Because computing device 2 includes a Maps application, and because Lena speaks a command that directs computing device to open the Maps application, computing device 2 may determine that John intended to delegate computing device 2 to Lena so that Lena may use the Maps application when John says "Lena, please check the route in Maps."

Further, computing device 2 may receive motion data, such as via sensors 10, which are indicative of John physically handing computing device 2 to Lena. Such motion data may strengthen the inference that John intends to delegate computing device 2 to Lena. As such, computing device 2 may determine delegation of computing device 2 from John to Lena based further at least in part on motion data received by computing device 2.

Delegation module 16 may also be able to determine that voice inputs received by computing device 2 from a first user and a second user indicate intentional delegation of computing device 2 from the first user to the second user even if neither the delegator (i.e., first user) nor the delegatee (i.e., the second user) speaks a voice command that is recognized by delegation module 16 as a command that directs delegation module 16 to delegate computing device 2 from the first user to the second user or a command that directs delegation module 16 to accept delegation of computing device 2 by the second user from the first user. Computing device 2 may receive voice input from a conversation held between the first user and the second user and may determine, based on the conversation, a delegation of computing device 2 from the first user to the second user. For example, John may ask Lena "Lena, which road should I take to avoid traffic?" Lena may respond by saying "let me check that with your phone." In this example, neither of the voice inputs received by computing device 2 from John and Lena is a command that is recognized by delegation module 16.

However, delegation module 16 may receive the conversation between John and Lena as vocal input and may parse the conversation to determine that John implicitly delegated computing device 2 to Lena and that Lena in response implicitly accepts the delegation of computing device 2. Delegation module 16 may determine that the sentence "Lena, which road should I take to avoid traffic" includes the name Lena and is a question directed towards Lena. Further, delegation module 16 may determine that the question asked by John can be answered using the Maps application on computing device 2. As such, delegation module 16 may determine that the phrase spoken by John is an implicit command to delegate computing device 2 to Lena. Delegation module 16 may further determine that the sentence "let me check that with your phone" includes the word "your phone" as well as the action term "check that." As such, delegation module 16 may determine that the phrase spoken by Lena is an implicit command to accept delegation of computing device 2 from John.

In other examples, delegation module 16 may also determine that voice inputs received by computing device 2 from a first user and a second user indicate intentional delegation of computing device 2 from the first user to the second user based at least in part on emotions detected in the speech of the first user and/or the second user. Delegation module 16 may analyze the speech of the first user and/or the second user to determine any emotions associated with the first user and/or the second user and may determine an intent by the first user to delegate computing device 2 to the second user based at least in part on the emotions of the first user as expressed by the first user's speech.

For example, a mom may physically give computing device 2 to her child so that her child may play a computer game on computing device 2. Because the mom may be apprehensive about her child possibly damaging computing device 2, she may tell the child "be careful" or may otherwise speak in an apprehensive tone. Delegation module 16 may analyze the mom's speech and may determine a change in emotional state in the mom and/or may determine an apprehensive emotion based on the mom's speech. Delegation module 16 may then determine that the mom intends to delegate computing device 2 based at least in part on the emotion detected in the mom's speech. Such a determination of emotion as discussed herein may be combined with additional techniques for determining intentional delegation of computing device 2 discussed throughout this disclosure.

Delegation module 16 may further determine whether the user that possesses computing device 2 during or after delegation of computing device 2 by delegator is the intended delegatee of computing device 2 based at least in part on authenticating the user that possesses computing device 2. Computing device 2 may perform such authentication by authenticating the fingerprint, facial features, and/or other biometric features of the user. If the delegator specifies the name of the intended delegatee (e.g., Lena) or any other suitable identifier of the intended delegatee, and if computing device 2 includes a user profile for the specified delegatee with which enrolled biometric data for the delegatee is associated, computing device 2 may capture the fingerprints of the user that physically possesses computing device 2 via a fingerprint reader, capture images of the user's face via a camera, and the like, and may compare the captured fingerprints and/or facial images with enrolled fingerprints or facial features to authenticate the user as the intended delegatee of computing device 2.

Possession module 18 may, based at least in part on at least one of the change in behavioral characteristics of the user of computing device 2 determined by behavioral module 14, and the intent to delegate computing device 2 as determined by delegation module 16, determine a change in possession of computing device 2. Delegation control module 8 may, based at least in part on the change in possession of computing device 2 as determined by possession module 18, change the level of access of functionality of computing device 2 from a first level of access to a second level of access. The first level of access may be the level of access to the functionality of computing device 2 that is granted to the user determined to be possessing computing device 2 prior to the change in possession. For example, the first level of access may be the level of access of the user that intends to delegate computing device 2. Behavioral module 14 may associate a user who physically possesses computing device 2 with a set of behavioral characteristics. Delegation control module 8 may grant the user with a first level of access to functionality of computing device 2. When behavioral module 14 determines a change in possession of computing device 2, delegation control module 8 may change the level of access to functionality of computing device 2 from the first level of access to a second level of access.

The second level of access may be a lower level of access to functionality of computing device 2 than the first level of access. A lower level of access to functionality of computing device 2 may include computing device 2 making unavailable one or more applications that are available at the first level of access, making unavailable or otherwise limiting one or more features of one or more applications that are available at the first level of access, preventing access to data (e.g., photos, videos, e-mails, etc.) that are accessible at the first level of access, and the like.

For example, if computing device 2 changes in possession away from the primary user of computing device 2, then, in response to determining the change in possession, computing device 2 may enter a limited access state that locks down personal data that is stored in or accessible by computing device 2, such that a user that takes possession of computing device 2 after the change in possession away from the primary user of computing device 2 will be unable to access personal e-mails, photos, social networking accounts, and the like of the primary user.

In examples where behavioral module 14 determines that the user physically possessing computing device 2 is the primary user of computing device 2, and that the change in possession of computing device 2 is a change away from the primary user being in possession of computing device 2, such that the primary user of computing device 2 is no longer physically possessing computing device 2 after the change in possession of computing device 2, delegation control module 8 may change the level of access to functionality of computing device 2 from a first level of access granted to the primary user of computing device 2 to a second level of access that is of a lower level of access than the first level of access. In other words, the second level of access may be more limited or restricted than the first level of access. For example, while the first level of access may include access to the primary user's e-mails in an e-mail application, access to the primary user's photos in a photo application, access to the primary users' social network accounts in social networking applications, and the like, the second level of access may limit or prevent access to the primary user's personal information, such as the primary user's e-mails in an e-mail application, access to the primary user's photos in a photo application, access to the primary users' social network accounts in social networking applications, and the like.

If the change in possession of computing device 2 includes a first user delegating computing device 2 to a second user via voice input, delegation control module 8 may determine the second level of access to functionality of computing device 2 based at least in part on the voice inputs received by computing device 2 from the first user and the second user. In examples, where a first user delegates computing device 2 to a second user, the voice input from the first user that includes an intent to delegate computing device 2 may also specify an access level of the functionality for the second user. In the example of where first user states "delegate my phone to Lena as a user level 2," "user level 2" may be associated with a specific set of access rights and/or permissions to functionality of computing device 2. In some examples, if the user specifies a specific delegatee (e.g., "Lena"), the delegatee may be associated with a specific level of access. In some examples, the first and second users may specify the application on computing device 2 that the delegatee is restricted to using. For example, in the aforementioned example where the first user says "Lena, please check the route in Maps," and the second user says "open Maps," the second user may have a level of access that enables the second user to only use the Maps application and that locks the second user out of the other functionalities of computing device 2.

In the example of FIG. 1, GUI 20A presented by UI device 4 may present UI elements 22, 24, and 26 associated with a photos application, an e-mail application, and a maps application, respectively. The photos application, e-mail application, and the maps application may be functionality that is accessible to the user of computing device 2 at the first level of access. In response to delegation control module 8 changing the level of access to functionality of computing device 2 from the first level of access to the second level of access, UI module 6 may cause UI device 4 to transition from presenting GUI 20A to presenting GUI 20B, which may present functionality that is accessible to the user of computing device 2 at the second level of access. For example, while the photos application, the e-mail application, and the maps application may all be accessible at the first level of access, only the maps application may be accessible at the second level of access. In the example of FIG. 1, at the second level of access, GUI 20B may present UI element 26 that the user may select to access the maps application, but may not present UI elements 22 and 24 associated with the photos application and the e-mail application, respectively, thereby preventing the user from accessing the photos application and the e-mail application at the second level of access.

In instances in which computing device 2 may collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by computing device 2 or other computing devices.

Figure 2:
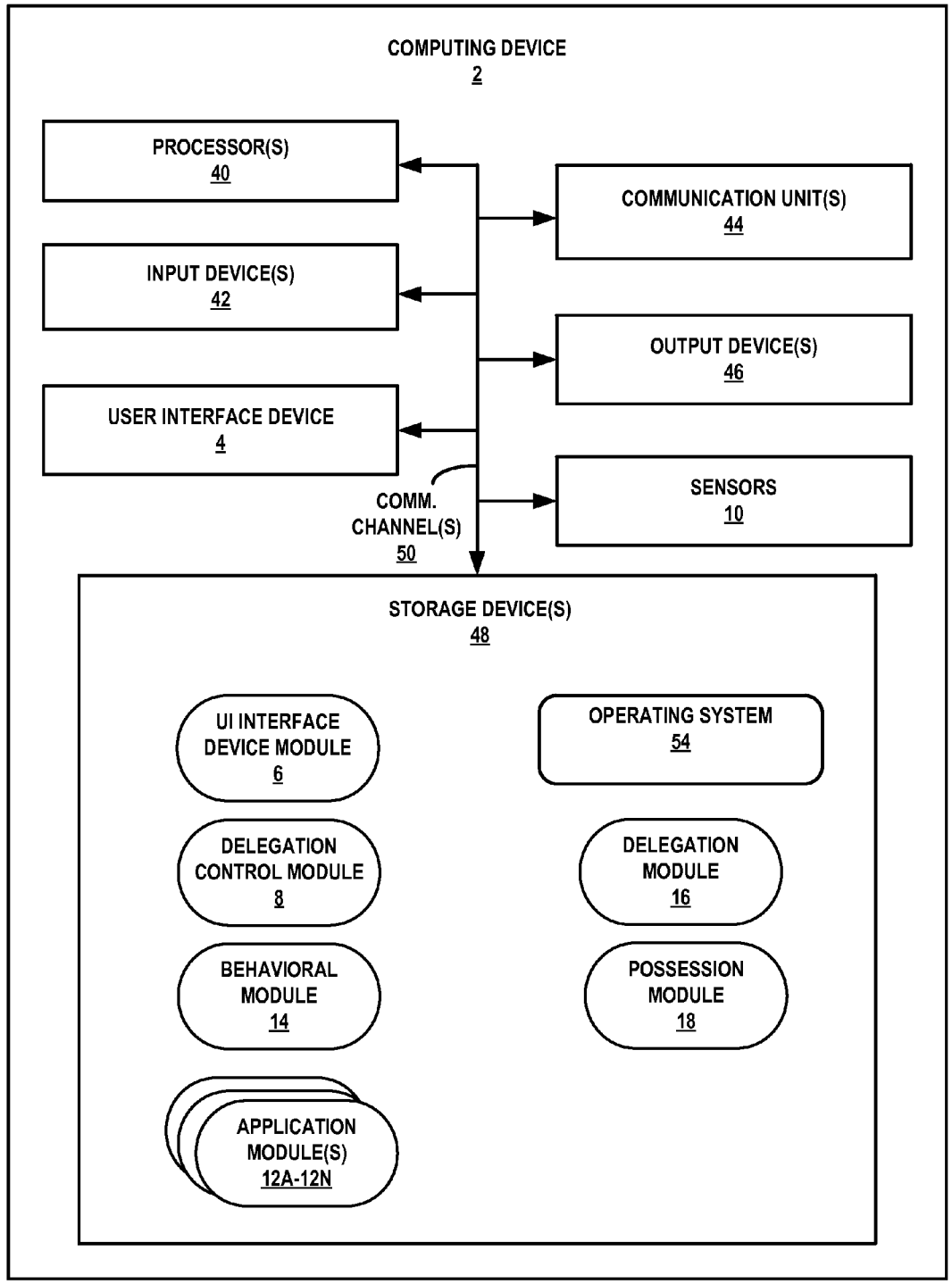
FIG. 2 is a block diagram illustrating the exemplary computing device of FIG. 1 in further detail.

FIG. 2 is a block diagram illustrating the exemplary computing device of FIG. 1 in further detail. Computing device 2 of FIG. 2 is described below within the context of computing device 2 of FIG. 1. FIG. 2 illustrates only one particular example of computing device 2 of system 1, and many other examples of computing device 2 may be used in other instances and may include a subset of the components included in example computing device 2 or may include additional components not shown in FIG. 2.

As shown in the example of FIG. 2, computing device 2 includes user interface device 4 ("UID 4"), one or more processors 40, one or more input devices 42, one or more communication units 44, one or more output devices 46, and one or more storage devices 48. Storage devices 48 of computing device 2 also include UI module 6, delegation control module 8, sensors 10, application modules 12A-12N ("application modules 12"), behavioral module 14, delegation module 16, and operating system 54. Communication channels 50 may interconnect each of the components 4, 6, 8, 10, 12, 14, 16, 40, 42, 44, 46, 48, and 54 for inter-component communications (physically, communicatively, and/or operatively). In some examples, communication channels 50 may include a system bus, a network connection, an inter-process communication data structure, or any other method for communicating data.

One or more input devices 42 of computing device 2 may receive input. Examples of input are tactile, audio, and video input. Input devices 42 of computing device 2, in one example, includes a presence-sensitive display, touch-sensitive screen, mouse, keyboard, voice responsive system, video camera, microphone or any other type of device for detecting input from a human or machine.

One or more output devices 46 of computing device 2 may generate output. Examples of output are tactile, audio, and video output. Output devices 46 of computing device 2, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 2 may communicate with external devices via one or more networks by transmitting and/or receiving network signals on the one or more networks. For example, computing device 2 may use communication unit 44 to send and receive data to and from information server system 60 of FIG. 1. Computing device 2 may use communication unit 44 to transmit and/or receive radio signals on a radio network such as a cellular radio network. Likewise, communication units 44 may transmit and/or receive satellite signals on a satellite network such as a global positioning system (GPS) network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless Ethernet network radios, as well as universal serial bus (USB) controllers.

In some examples, UID 4 of computing device 2 may include functionality of input devices 42 and/or output devices 46. In the example of FIG. 2, UID 4 may be or may include a presence-sensitive input device. In some examples, a presence sensitive input device may detect an object at and/or near a screen. As one example range, a presence-sensitive input device may detect an object, such as a finger or stylus that is within 2 inches (about 5 centimeters) or less of the screen. The presence-sensitive input device may determine a location (e.g., an (x,y) coordinate) of a screen at which the object was detected. In another example range, a presence-sensitive input device may detect an object six inches or less from the screen and other ranges are possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 4 presents a user interface (such as user interface 10 of FIG. 1).

While illustrated as an internal component of computing device 2, UID 4 also represents and external component that shares a data path with computing device 2 for transmitting and/or receiving input and output. For instance, in one example, UID 4 represents a built-in component of computing device 2 located within and physically connected to the external packaging of computing device 2 (e.g., a screen on a mobile phone). In another example, UID 4 represents an external component of computing device 2 located outside and physically separated from the packaging of computing device 2 (e.g., a monitor, a projector, etc. that shares a wired and/or wireless data path with a tablet computer).

Sensors 10 of computing device 2 may include hardware and/or software that measures motion data, orientation data, position data, environmental conditions, and other suitable data, and may output sensor data that quantify the measured data. Examples of sensors 10 may include one or more of: an accelerometer, a gyroscope, a gravity sensor, a rotational vector sensor, a light sensor, a temperature sensor, a pressure sensor, a proximity sensor, a voice sensor (e.g., a microphone), a physical switch, orientation sensors, a magnetometer, and the like.

One or more storage devices 48 within computing device 2 may store information for processing during operation of computing device 2 (e.g., computing device 2 may store data accessed by modules 6, 8, 12, 14, and 16 during execution at computing device 2). In some examples, storage device 48 is a temporary memory, meaning that a primary purpose of storage device 48 is not long-term storage. Storage devices 48 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with modules 6, 8, 12, 14, and 16.

One or more processors 40 may implement functionality and/or execute instructions within computing device 2. For example, processors 40 on computing device 2 may receive and execute instructions stored by storage devices 48 that execute the functionality of UI device module 6, delegation control module 8, application modules 12, behavioral module 14, delegation module 16, and operating system 54. These instructions executed by processors 40 may cause computing device 2 to store information, within storage devices 48 during program execution. Processors 40 may execute instructions of modules 6, 8, 12, 14, and 16 to cause UI device 4 to present GUI 10. That is, modules 6, 8, 12, 14, and 16 may be operable by processors 40 to perform various actions or functions of computing device 2 as described in this application.

Computing device 2 may be part of a mobile communications network. Computing device 2 may exchange data with a server or cloud computing system over the mobile communications network via one or more communication units 44. The server or cloud computing system may perform some or all of the techniques and operations related to modules 6, 8, 12, 14, and 16 described herein. In other words, some or all of the techniques and operations related to modules 6, 8, 12, 14, and 16 can be implemented locally at computing device 2, for instance, a mobile phone, and some or all of the techniques and operations may be performed remotely via a server connected to the mobile communications network that exchanges data with computing device 2. In other words, while shown in FIG. 2 as being included within computing device 2, modules 6, 8, 12, 14, and 16 may be a part of a remote computing system and may execute as one or more remote computing services, such as one or more services provided by a cloud and/or cluster based computing system.

Operating system 54 may execute to cause computing device 2 to perform various functions to manage hardware resources of computing device 2 and to provide various common services for other computer programs. Application modules 12 may cause computing device 2 to provide various applications (e.g., "apps").

Behavioral module 14 may receive sensor data from sensors 10 and may determine, based at least from the sensor data received from sensors 10, behavioral characteristics of the user that is in physical possession of computing device 2. Behavioral module 14 may also receive sensor data from sensors of associated wearable devices that are worn by or otherwise physically attached to the user that is in physical possession of computing device 2. For example, behavioral module 14 may receive sensor data from an accelerometer, a gyroscope, and the like of a smart watch that is worn by the user that physically possesses computing device 2.

Behavioral module 14 may detect a change in behavioral characteristics of the user of computing device 2 based at least in part on the sensor data received from sensors 10 and may determine a change in possession of computing device 2 based at least in part on the change in behavioral characteristics. Behavioral module 14 may detect a change in movement patterns of the user of computing device 2, such as a change in gait patterns and/or a change in hand movement patterns based at least in part on the sensor data received from sensors 10. Behavioral module 14 may determine whether the change in movement patterns exceed a specified threshold for more than a specified period of time and, if so, may determine that a change in possession of computing device 2 has taken place.

Delegation module 16 may determine a change in possession of computing device 2 based at least in part on the voice input received by the delegation module 16. Delegation module 16 may determine delegation of computing device 2 from a first user to a second user based at least in part on the voice inputs received from the first user and the second user.

Computing device 2 may receive a first voice input from the first user that has possession of computing device 2 that specified an intent to delegate computing device 2 to the second user. Subsequently, computing device 2 may receive a second voice input from the second user that accepts delegation of computing device 2 from the first user. Delegation module 16 may infer, from the first voice input and the second voice input, that the first user intends to delegate computing device 2 to the second user, and that the second user accepts delegation of computing device from the first user. Delegation module 16 may determine such an inference by performing natural language processing of the first voice input and the second voice input.

In one example, the first voice input received by computing device 2 may be a command recognized by delegation module 16 to delegate computing device 2, and the second voice input received by computing device 2 may be a command recognized by delegation module 16 to accept delegation of computing device 2. The command to delegate computing device 2 may specify both the user to delegate computing device 2 to and may specify the level of access to grant to the user after delegation of computing device 2.

In another example, the first voice input received by computing device 2 may not be a command recognized by delegation module 16 to delegate computing device 2. However, delegation module 16 may determine that the first voice input nonetheless comprises an unintentional delegation of computing device 2 by the first user to the second user. Subsequently, the second voice input received by computing device 2 may comprise a voice command directed at computing device 2 that directly or indirectly accepts delegation of computing device 2 from the first user. Delegation module 16 may infer, from the first voice input and the second voice input, that the first user intends to delegate computing device 2 to the second user, and that the second user accepts delegation of computing device from the first user.

In another example, neither the first voice input nor the second voice input received by computing device 2 may be a command recognized by delegation module 16 to delegate computing device 2. For example, the first and second voice inputs may be part of a conversation between the first user and the second user. Delegation module 16 may parse the first and second voice inputs to determine that the first voice input comprises an implicit command to delegate computing device 2, and that the second voice input comprises an implicit command to accept delegation of computing device 2. In this way, delegation module 16 may infer, from the first voice input and the second voice input, that the first user intends to delegate computing device 2 to the second user, and that the second user accepts delegation of computing device from the first user without receiving explicit voice commands from the first user to delegate computing device 2 and without receiving explicit voice commands from the second user to accept delegation of computing device 2.

Possession module 18 may determine a change in possession of computing device 2 based at least in part on the change in possession of computing device 2 determined by behavioral module 14. Possession module 18 may also determine a change in possession of computing device 2 based at least in part on delegation of computing device 2 from a first user to a second user determined by delegation module 14. Delegation control module 8 may, based at least in part on a change in possession of computing device 2 as determined by possession module 16, change at least a level of access to functionality of computing device 2 from a first level of access to a second level of access. In some examples, if the change in possession of computing device 2 corresponds with the primary user of computing device 2 no longer being in possession of computing device 2, the second level of access may be of a lower level of access than the first level of access, meaning that the second level of access may have less access to the functionality of computing device 2 than the first level of access.

The level of access to functionality of computing device 2 may define applications of computing device that the user is able to use. The level of access may also define the functionality of those applications that the user is able to access. For example, the level of access may not only define that the user is allowed to access a web browser application on computing device 2, but may also limit the websites that the user can view using the web browser. In another example, the level of access may allow the user to access and use a phone application on computing device 2, but may limit the user to receiving calls using the phone application.

In some examples, computing device 2 may associate levels of access with users of computing device 2. Such association may be made manually by a primary user of computing device 2 or may be made automatically. If computing device 2 changes possession from a first user to a second user, and computing device 2 is able to identify that the second user is now in possession of computing device 2 after the change in possession, delegation module 8 may change the level of access to functionality of computing device 2 to a level of access associated with the second user.

Figure 3:
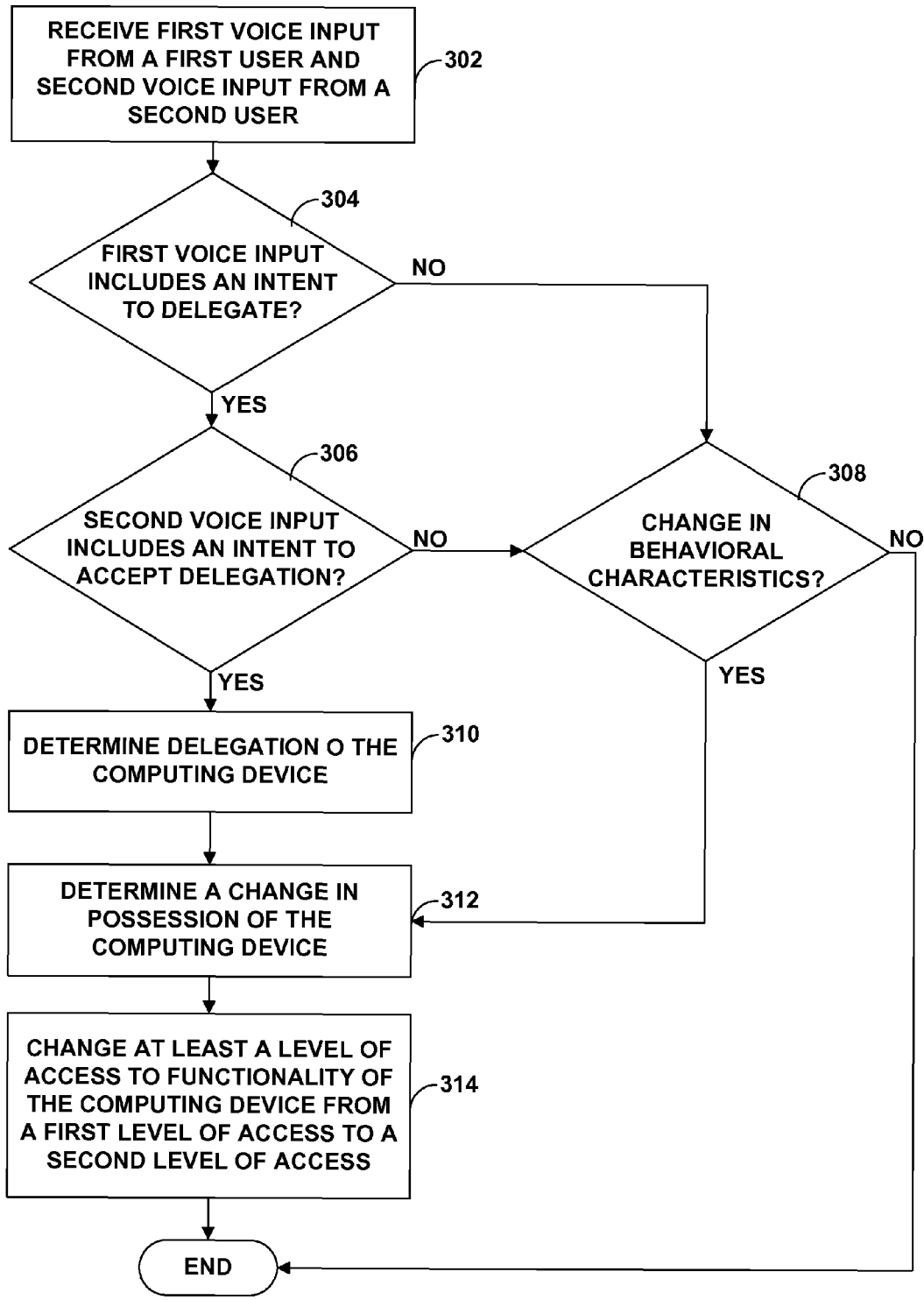
FIG. 3 is a flowchart illustrating an exemplary mode of operation for automatic delegation control for sharing a computing device in accordance with one or more techniques of the present disclosure.

FIG. 3 is a flowchart illustrating an example mode of operation for automatic delegation control for sharing a computing device in accordance with one or more techniques of the present disclosure. As shown in FIG. 3, an audio input device of computing device 2 may receive a voice input that includes a first voice input from a first user and a second voice input from a second user (302). Delegation module 16 may determine whether the first voice input from the first user specifies an intent by the first user to delegate computing device 2 to the second user (304). If delegation module 16 determines that the first voice input from the first user specifies an intent by the first user to delegate computing device to the second user, the audio input device 2 may determine whether the second voice input from the second user specifies an intent by the second user to accept delegation of computing device 2 from the first user (306). For example, the first voice input from the first user may comprise a voice command that computing device 2 recognizes as a command to delegate computing device 2 to the second user, and the second voice input from the second user may comprise a voice command that computing device 2 recognizes as a command to accept delegation of computing device 2 from the first user.

If delegation module 16 determines that the first voice input from the first user does not specify an intent by the first user to delegate computing device 2 to the second user, or if delegation module 16 determines that the second voice input from the second user does not specify an intent by the second user to accept delegation of computing device 2 from the first user, behavioral module 14 may determine whether there has been a change in behavioral characteristics of the user that is in possession of computing device 2 that indicates a change in possession of computing device 2 (308). In some examples, the change in behavioral characteristics of the user that is in possession of computing device 2 comprises change in motion characteristics of the user that is in possession of computing device 2, such as a change in gait characteristics or a change in hand or arm motion characteristics. Behavioral module 14, in some examples, may determine whether there has been a change in behavioral characteristics of the user that is in possession of computing device 2 without receiving the first voice input and/or the second voice input.

If delegation module 16 determines that the first voice input from the first user specifies an intent by the first user to delegate computing device 2 to the second user, and if delegation module 16 determines that the second voice input from the second user specifies an intent by the second user to accept delegation of computing device 2 from the first user, delegation module 16 may determine a delegation of computing device 2 has taken place from the first user to the second user (310).

Possession module 18 may determine a change in possession of computing device 2 based at least in part on one or more of: device delegation of computing device 2 from the first user to the second user and the change in behavioral characteristics determined by behavioral module 14 to be indicative of a change in possession of computing device 2 (312).

In response to determining the change in possession of computing device 2, delegation control module 8 may change at least a level of access to functionality of computing device 2 from a first level of access to a second level of access (314). The first level of access may be associated with the first user and the second level of access may be associated with the second user. Further, the first voice input may specify the second level of access for the second user. In some examples, the second level of access may comprise a lower level of access to the functionality of computing device 2 than the first level of access.

Figure 4:
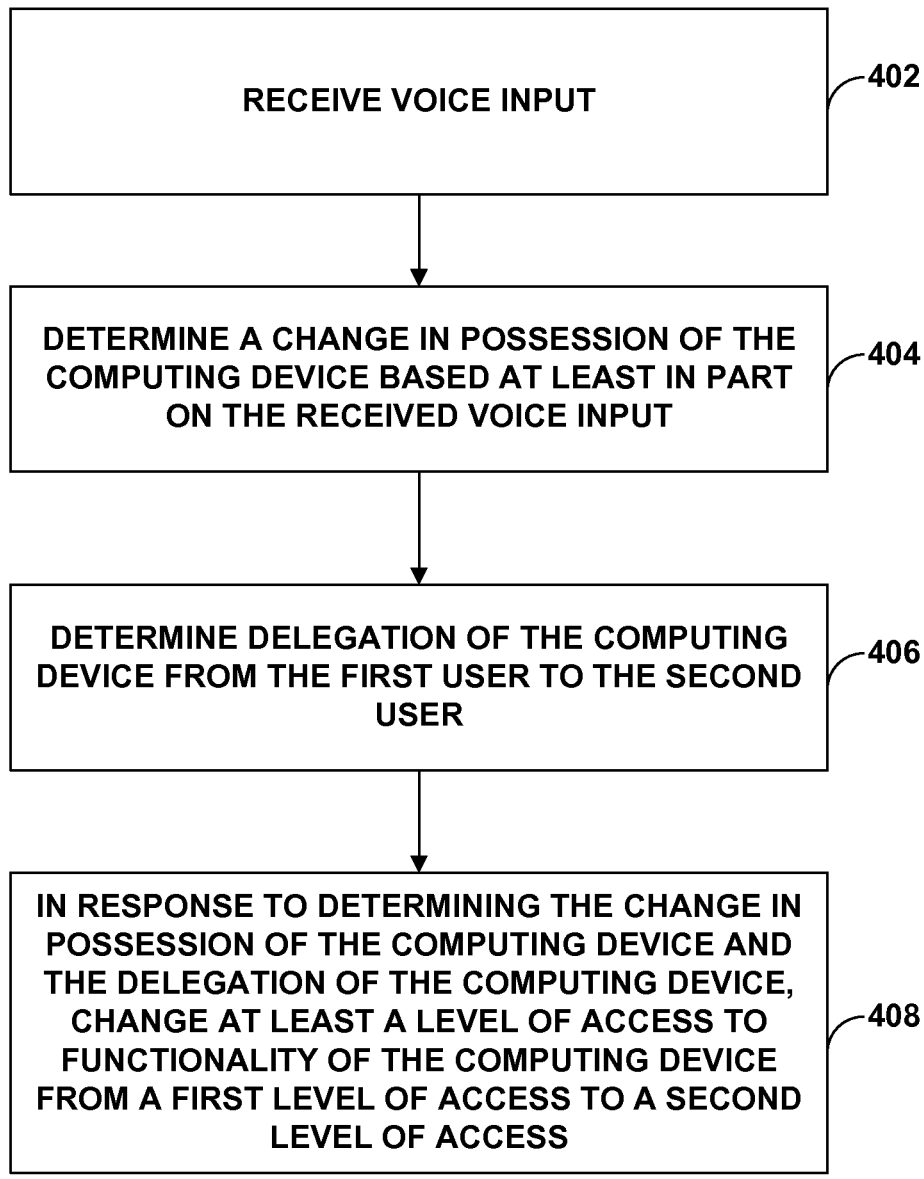
FIG. 4 is a flowchart illustrating an exemplary mode of operation for automatic delegation control for sharing a computing device in accordance with one or more techniques of the present disclosure.

FIG. 4 is a flowchart illustrating an example mode of operation for automatic delegation control for sharing a computing device in accordance with one or more techniques of the present disclosure. As shown in FIG. 4, a microphone or any other suitable audio input device of computing device 2 may receive voice input that includes a first voice input from a first user and a second voice input from a second user (402). The voice input may include first voice input received by computing device 2 from a first user and second voice input received by computing device 2 from a second user. Delegation module 16 may determine that the first voice input and the second voice input indicate a delegation of computing device 2 from the first user to the second user. Delegation module 16 may determine that the first voice input from the first user specifies an intent by the first user to delegate computing device 2 to the second user. Delegation module 16 may further determine that the second voice input from the second user specifies an intent by the second user to accept delegation of computing device 2 from the first user. For example, the first voice input from the first user may comprise a voice command that computing device 2 recognizes as a command to delegate computing device 2 to the second user, and the second voice input from the second user may comprise a voice command that computing device 2 recognizes as a command to accept delegation of computing device 2 from the first user.

Possession module 18 may determine, based at least in part on the received voice input, a change in possession of computing device 2 based at least in part on the received voice input (404). Delegation module 16 may determine, based at least in part on the first voice input and the second voice input, delegation of computing device 2 from the first user to the second user (406). In response to determining the change in possession of computing device 2 and the delegation of computing device 2, delegation control module 8 may change at least a level of access to functionality of computing device 2 from a first level of access to a second level of access (408). The first level of access may be associated with the first user and the second level of access may be associated with the second user. Further, the first voice input may specify the second level of access for the second user. In some examples, the second level of access may provide less access to the functionality of computing device 2 than the first level of access.

In some examples, determining delegation of computing device 2 from the first user to the second user may be further based at least in part on biometric data received by computing device 2. In some examples, determining delegation of computing device 2 from the first user to the second user is further based at least in part on motion data received by computing device 2. In some examples, possession module 18 may determine the change in possession of computing device 2 based at least in part on behavioral module 14 determining a change in behavioral characteristics of a user that is in possession of computing device 2. In some examples, the change in behavioral characteristics of the user that is in possession of computing device 2 comprises change in motion characteristics of the user that is in possession of computing device 2.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), central processing units (CPUs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. In addition, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

The invention claimed is:

1. A method comprising:
    receiving, by a computing device, voice input that includes first voice input from a first user and second voice input from a second user, wherein the first voice input comprises conversational speech directed towards the second user;
    determining, by the computing device and based at least in part on the received voice input, a change in possession of the computing device;
    determining, by the computing device and based at least in part on the first voice input and the second voice input, delegation of the computing device from the first user to the second user, including determining that the conversational speech directed towards the second user comprises an intent by the first user to delegate the computing device to the second user to access a functionality of the computing device in place of the first user; and
    in response to determining the change in possession of the computing device and the delegation of the computing device, changing, by the computing device, at least a level of access to functionality of the computing device from a first level of access to a second level of access that includes access to the functionality.

2. The method of claim 1, wherein determining the delegation of the computing device comprises:
    determining, by the computing device, that the second voice input from the second user specifies an intent by the second user to accept delegation of the computing device from the first user.

3. The method of claim 2, wherein:
    the second voice input from the second user comprises a command to accept delegation of the computing device from the first user.

4. The method of claim 1, wherein:
    the first level of access is associated with the first user; and
    the second level of access is associated with the second user.

5. The method of claim 4, wherein the first voice input specifies the second level of access.

6. The method of claim 1, wherein the second level of access provides less access to one or more functionalities of the computing device than the first level of access.

7. The method of claim 1, wherein determining the change in possession of the computing device comprises determining, by the computing device, a change in behavioral characteristics of a user that is in possession of the computing device.

8. The method of claim 7, wherein the change in behavioral characteristics of the user that is in possession of the computing device comprises a change in motion characteristics of the user that is in possession of the computing device.

9. A computing device comprising:
    a memory configured to store instructions;
    an audio input device configured to receive voice input that includes first voice input from a first user and second voice input from a second user, wherein the first voice input comprises conversational speech directed towards the second user; and
    one or more processors configured to execute the instructions to:
        determine, based at least in part on the received voice input, a change in possession of the computing device;
        determine, based at least in part on the first voice input and the second voice input, delegation of the computing device from the first user to the second user, including determining that the conversational speech directed towards the second user comprises an intent by the first user to delegate the computing device to the second user to access a functionality of the computing device in place of the first user; and
        in response to determining the change in possession of the computing device and the delegation of the computing device, change at least a level of access to functionality of the computing device from a first level of access to a second level of access that includes access to the functionality.

10. The computing device of claim 9, wherein the one or more processors are further configured to execute the instructions to:
    determine that the second voice input from the second user specifies an intent by the second user to accept delegation of the computing device from the first user.

11. The computing device of claim 10, wherein:
    the second voice input from the second user comprises a command to accept delegation of the computing device from the first user.

12. The computing device of claim 10, wherein:
    the first voice input from the first user comprises a command to delegate the computing device to the second user; and
    the second voice input from the second user comprises a command to accept delegation of the computing device from the first user.

13. The computing device of claim 9, wherein the first voice input specifies the second level of access.

14. The computing device of claim 9, wherein the one or more processors are further configured to:
    determine a change in behavioral characteristics of a user that is in possession of the computing device.

15. A non-transitory computer readable medium encoded with instructions that, when executed, cause one or more processors of a computing device to:

receive voice input that includes first voice input from a first user and second voice input from a second user, wherein the first voice input comprises conversational speech directed towards the second user;

determine, based at least in part on the received voice input, a change in possession of the computing device;

determine, based at least in part on the first voice input and the second voice input, delegation of the computing device from the first user to the second user, including determining that the conversational speech directed towards the second user comprises an intent by the first user to delegate the computing device to the second user to access a functionality of the computing device in place of the first user; and in response to determining the change in possession of the computing device and the delegation of the computing device, change at least a level of access to functionality of the computing device from a first level of access to a second level of access that includes access to the functionality.

16. The non-transitory computer readable medium of claim 15, further comprising:

determine that the second voice input from the second user specifies an intent by the second user to accept delegation of the computing device from the first user.

17. The non-transitory computer readable medium of claim 16, wherein:

the second voice input from the second user comprises a command to accept delegation of the computing device from the first user.

18. The non-transitory computer readable medium of claim 15, wherein:

the first level of access is associated with the first user; and the second level of access is associated with the second user.

19. The non-transitory computer readable medium of claim 18, wherein the first voice input specifies the second level of access.

20. The non-transitory computer readable medium of claim 15, wherein determine the change in possession of the computing device comprises determine a change in behavioral characteristics of a user that is in possession of the computing device.

* * * * *